United States Patent
Bennett

(10) Patent No.: US 10,129,585 B2
(45) Date of Patent: Nov. 13, 2018

(54) ADVANCE NOTIFICATION OF CATCH-UP EVENTS THROUGH BROADCAST METADATA

(71) Applicant: DISH Technologies L.L.C., Englewood, CO (US)

(72) Inventor: Stephen Michael Bennett, West Yorkshire (GB)

(73) Assignee: DISH Technologies L.L.C., Englewood, CO (US)

( * ) Notice: Subject to any disclaimer, the term of this patent is extended or adjusted under 35 U.S.C. 154(b) by 101 days.

(21) Appl. No.: 14/202,265

(22) Filed: Mar. 10, 2014

(65) Prior Publication Data

US 2014/0270712 A1    Sep. 18, 2014

Related U.S. Application Data

(60) Provisional application No. 61/791,985, filed on Mar. 15, 2013.

(51) Int. Cl.
*H04N 9/79* (2006.01)
*H04N 21/433* (2011.01)
(Continued)

(52) U.S. Cl.
CPC ......... *H04N 21/4334* (2013.01); *H04N 5/782* (2013.01); *H04N 21/4532* (2013.01);
(Continued)

(58) Field of Classification Search
CPC .......... H04N 21/4334; H04N 21/4532; H04N 21/4583; H04N 21/47214; H04N 21/4882; H04N 5/782
(Continued)

(56) References Cited

U.S. PATENT DOCUMENTS 8,122,094 B1 * 2/2012 Kotab ............... H04N 21/2747
706/52
8,245,257 B1 * 8/2012 Stettner ............. H04N 5/44543
725/109
(Continued)

FOREIGN PATENT DOCUMENTS

EP    2 779 677 A1    9/2014

OTHER PUBLICATIONS

European Search Report for EP 14159896 dated Jul. 10, 2014, 5 pages.
(Continued)

*Primary Examiner* — Thai Tran
*Assistant Examiner* — Stephen Smith
(74) *Attorney, Agent, or Firm* — Kilpatrick Townsend & Stockton LLP

(57) ABSTRACT

Systems, methods, devices, and computer products to manage recording resources for programming events of interest are disclosed. A first indication of a first selection of a first programming event to record may be processed, and a recording may be scheduled in a recording schedule. A second indication of a second selection of a second programming event to record may be processed, and available resources to record may be ascertained. A resource conflict may be identified based on event scheduling information for the first and/or second programming event. First and/or second programming metadata may be processed. Availability of alternative viewing options for the first and/or second programming event may be ascertained. The ascertaining may be based on the first and/or second programming metadata. Based on the availability of alternative viewing options, it may be determined whether to maintain or modify the recording schedule, and the recording schedule may be managed accordingly.

16 Claims, 8 Drawing Sheets

(51) Int. Cl.
  *H04N 21/458* (2011.01)
  *H04N 21/45* (2011.01)
  *H04N 5/782* (2006.01)
  *H04N 21/472* (2011.01)
  *H04N 21/488* (2011.01)

(52) U.S. Cl.
  CPC ... *H04N 21/4583* (2013.01); *H04N 21/47214* (2013.01); *H04N 21/4882* (2013.01)

(58) Field of Classification Search
  USPC ..... 386/292–294, 296, 291; 725/53, 54, 109
  See application file for complete search history.

(56) References Cited

U.S. PATENT DOCUMENTS

| | | | | |
|---|---|---|---|---|
| 8,275,245 B2 * | 9/2012 | Amsterdam | ........... | H04N 5/765 386/291 |
| 8,358,913 B2 * | 1/2013 | Gustafson | ............. | H04N 5/782 386/291 |
| 8,528,024 B2 * | 9/2013 | Schwesinger | ...... | H04N 5/44543 386/292 |
| 8,615,164 B1 * | 12/2013 | Kotab | .................... | H04N 5/765 386/292 |
| 9,402,064 B1 * | 7/2016 | Kotab | .................... | H04N 5/765 |
| 9,674,577 B1 * | 6/2017 | Barton | .................. | H04N 21/47 |
| 2004/0103434 A1 * | 5/2004 | Ellis | .................. | H04N 5/44543 725/58 |
| 2007/0199022 A1 * | 8/2007 | Moshiri | ............ | H04N 5/44513 725/39 |
| 2008/0098433 A1 * | 4/2008 | Hardacker | ............ | H04N 7/163 725/52 |
| 2008/0152315 A1 * | 6/2008 | Peters | .................... | H04N 5/775 386/291 |
| 2008/0307485 A1 * | 12/2008 | Clement | ................. | H04N 5/76 725/152 |
| 2009/0119715 A1 * | 5/2009 | Schwesinger | ...... | H04N 5/44543 725/58 |
| 2009/0300673 A1 * | 12/2009 | Bachet | ............... | H04N 7/17318 725/31 |
| 2010/0080530 A1 * | 4/2010 | Clayton | ................... | H04N 5/76 386/291 |
| 2010/0158476 A1 * | 6/2010 | Hao | ....................... | H04N 5/782 386/291 |
| 2010/0162324 A1 * | 6/2010 | Mehta | ............... | H04N 7/17318 725/61 |
| 2010/0202754 A1 * | 8/2010 | Bhogal | .................... | H04N 5/76 386/291 |
| 2011/0179453 A1 * | 7/2011 | Poniatowski | ......... | G06F 3/0482 725/58 |
| 2011/0194840 A1 * | 8/2011 | Alexander | ............. | H04N 5/782 386/293 |
| 2011/0209167 A1 * | 8/2011 | Yamamoto | ......... | H04N 21/4882 725/9 |
| 2012/0301117 A1 * | 11/2012 | Alder | ................. | H04N 5/44543 386/293 |
| 2013/0114940 A1 * | 5/2013 | Merzon | .................... | H04N 5/76 386/241 |
| 2013/0136419 A1 * | 5/2013 | Herby | .................... | H04N 5/782 386/243 |
| 2013/0216207 A1 * | 8/2013 | Berry | ....................... | H04N 5/76 386/282 |
| 2013/0272682 A1 * | 10/2013 | Barton | ................... | H04N 5/765 386/291 |
| 2013/0330063 A1 * | 12/2013 | Bonovich | .......... | H04N 21/4222 386/292 |
| 2014/0082672 A1 * | 3/2014 | Casey | ............... | H04N 21/26283 725/50 |
| 2014/0245358 A1 * | 8/2014 | Kumar | ............... | H04N 21/4722 725/61 |

OTHER PUBLICATIONS

Office Action from the European Patent Office dated Jul. 21, 2015 for Appln. No. 14159896.1, 4 pages.

* cited by examiner

| BBC1 | 1.1 | 1.2 | 1.3 | 1.4 |
|---|---|---|---|---|
| BBC2 | 2.1 | | 2.2 | |
| ITV1 | 3.1 | | 3.2 | 3.3 |
| Channel 4 | 4.1 | 4.2 | 4.3 | |

FIG. 6A

| BBC1 | 1.1 | 1.2 | 1.3 | 1.4 |
|---|---|---|---|---|
| BBC2 | 2.1 | | 2.2 | |
| ITV1 | 3.1 | | 3.2 | 3.3 |
| Channel 4 | 4.1 | 4.2 | 4.3 | |

FIG. 6B

ADVANCE NOTIFICATION OF CATCH-UP EVENTS THROUGH BROADCAST METADATA

CROSS-REFERENCE TO RELATED APPLICATION

This application claims priority to U.S. provisional application 61/791,985, filed Mar. 15, 2013, entitled "ADVANCE NOTIFICATION OF CATCH-UP EVENTS THROUGH BROADCAST META-DATA," the entire disclosure of which is hereby incorporated by reference for all purposes.

BACKGROUND

The present disclosure relates in general to television devices, and, more specifically, but not by way of limitation, to advance notification of catch-up events through broadcast metadata.

The advent of the DVR (Digital Video Recorder) and the availability of high-capacity and affordable computer-readable storage devices has made available many possibilities to television programming service providers and viewers alike. In recent years, television viewers have come to expect the ability to customize and manage the recording of television programming via their television receivers. There is a need for improvements and solutions directed to the recording of television programming.

BRIEF SUMMARY

Certain embodiments of the present disclosure relate in general to television devices, and, more specifically, but not by way of limitation, to advance notification of catch-up events through broadcast metadata.

In one aspect, a method for managing recording resources for programming events of interest is disclosed. The method may include any one or combination of the following. A first indication of a first selection of a first set of one or more programming events to record may be processed. One or more recordings of the first set of one or more programming events may be scheduled in a recording schedule. A second indication of a second selection of a second set of one or more programming events to record may be processed. Available resources to record the second set of one or more programming events may be ascertained. A resource conflict may be identified based at least in part on event scheduling information for at least one programming event of the first set of one or more programming events and at least one programming event of the second set of one or more programming events. First programming metadata for the at least one programming event of the first set of one or more programming events and/or second programming metadata for the at least one programming event of the second set of one or more programming events may be processed. Availability of one or more alternative viewing options for one or both of the at least one programming event of the first set of one or more programming events and the at least one programming event of the second set of one or more programming events may be ascertained. The ascertaining the availability may be based at least in part on the first programming metadata and/or the second programming metadata. Based at least in part on the availability of the one or more alternative viewing options, it may be determined whether to maintain or modify the recording schedule. The recording schedule may be managed based at least in part on the determining whether to maintain or modify the recording schedule.

In another aspect, a television receiver to manage recording resources for programming events of interest is disclosed. The television receiver may include one or more processors and a memory communicatively coupled with and readable by the one or more processors and having stored therein processor-readable instructions which, when executed by the one or more processors, may cause the one or more processors to perform any one or combination of the following. A first indication of a first selection of a first set of one or more programming events to record may be processed. One or more recordings of the first set of one or more programming events may be scheduled in a recording schedule. A second indication of a second selection of a second set of one or more programming events to record may be processed. Available resources to record the second set of one or more programming events may be ascertained. A resource conflict may be identified based at least in part on event scheduling information for at least one programming event of the first set of one or more programming events and at least one programming event of the second set of one or more programming events. First programming metadata for the at least one programming event of the first set of one or more programming events and/or second programming metadata for the at least one programming event of the second set of one or more programming events may be processed. Availability of one or more alternative viewing options for one or both of the at least one programming event of the first set of one or more programming events and the at least one programming event of the second set of one or more programming events may be ascertained. The ascertaining the availability may be based at least in part on the first programming metadata and/or the second programming metadata. Based at least in part on the availability of the one or more alternative viewing options, it may be determined whether to maintain or modify the recording schedule. The recording schedule may be managed based at least in part on the determining whether to maintain or modify the recording schedule.

In yet another aspect, a non-transitory processor-readable medium is disclosed. The non-transitory processor-readable medium may include processor-readable instructions which, when executed by one or more processors, may cause the one or more processors to perform any one or combination of the following. A first indication of a first selection of a first set of one or more programming events to record may be processed. One or more recordings of the first set of one or more programming events may be scheduled in a recording schedule. A second indication of a second selection of a second set of one or more programming events to record may be processed. Available resources to record the second set of one or more programming events may be ascertained. A resource conflict may be identified based at least in part on event scheduling information for at least one programming event of the first set of one or more programming events and at least one programming event of the second set of one or more programming events. First programming metadata for the at least one programming event of the first set of one or more programming events and/or second programming metadata for the at least one programming event of the second set of one or more programming events may be processed. Availability of one or more alternative viewing options for one or both of the at least one programming event of the first set of one or more programming events and the at least one programming event of the second set of one or more programming events may be ascertained. The ascertaining the availability may be based at least in part on the first programming metadata and/or the second programming metadata. Based at least in part on the availability of the one or more alternative viewing options, it may be determined whether to maintain or modify the recording schedule. The recording schedule may be managed based at least in part on the determining whether to maintain or modify the recording schedule.

In various embodiments, a user notification relating to the resource conflict may be generated, the user notification for presentation via a display device, where the user notification suggests a conflict resolution. The managing the recording schedule may be responsive to a user selection of one or more user-selectable options presented with the user notification. The determining whether to maintain or modify the recording schedule may be further based at least partially on a set of one or more conflict rules. The first programming metadata and/or the second programming metadata may indicate a type of alternative viewing option for one or both of the at least one programming event of the first set of one or more programming events and the at least one programming event of the second set of one or more programming events. The first programming metadata and/or the second programming metadata may indicate a time of alternative viewing option for one or both of the at least one programming event of the first set of one or more programming events and the at least one programming event of the second set of one or more programming events. The one or more alternative viewing options may include one or more of a streaming option, a repeat airing, and/or a prior recording.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. When only the first reference label is used in the specification, the description is applicable to any one of the similar components having the same first reference label irrespective of the second reference label.

FIGS. 6A and 6B show the programming guide and recording schedule of an example embodiment, in accordance with certain embodiments of the present disclosure.

DETAILED DESCRIPTION

Figure 1:
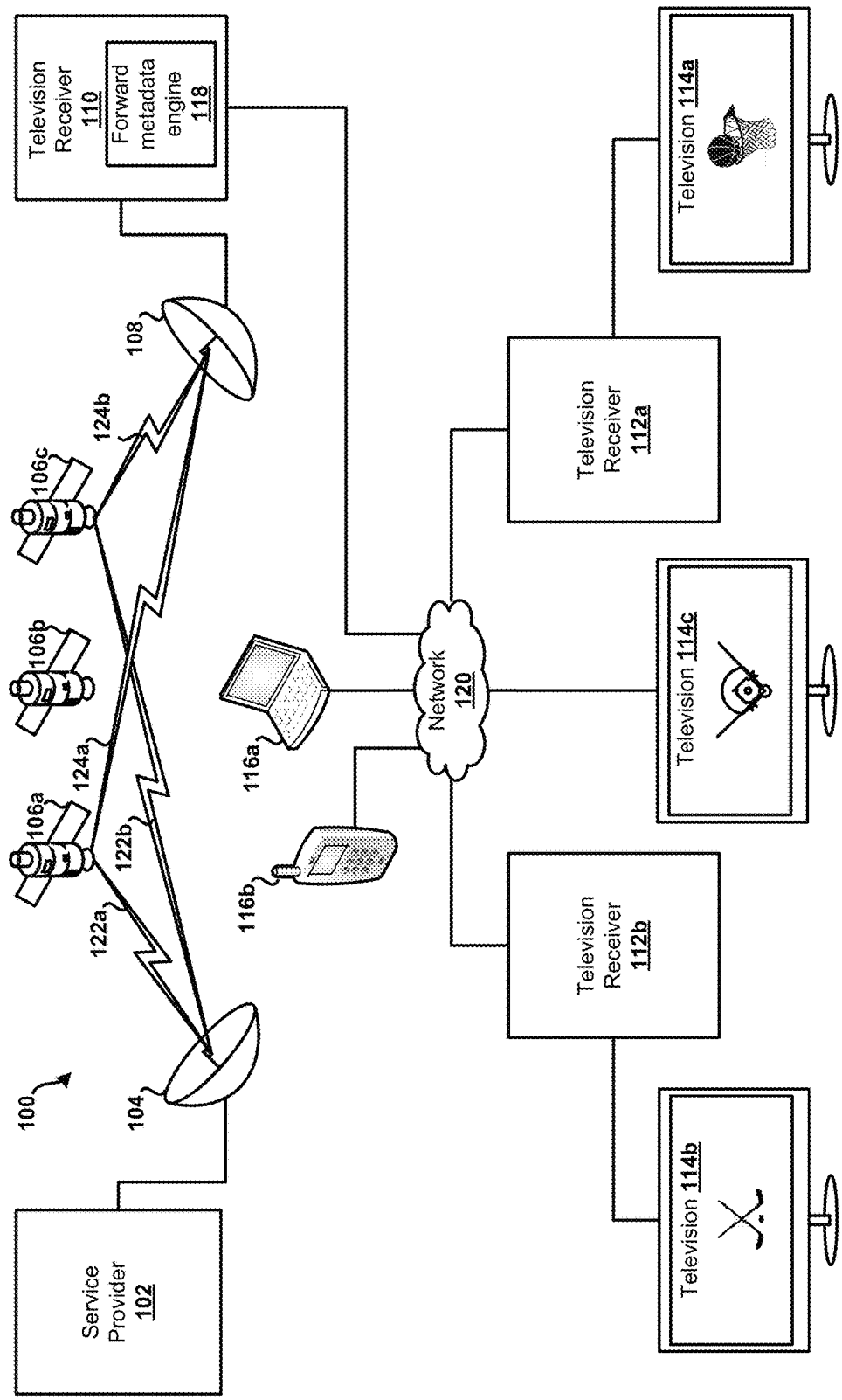
FIG. 1 shows an example media content distribution system in which aspects of the present disclosure may be implemented, in accordance with certain embodiments.

In some embodiments some television channels, programming, shows, movies, and the like (collectively referred to as "programming events") may be available multiple times or may be available after their initial on-air time. The programming events may be automatically recorded by the service provider and made available to the user as a service, service option, or the like. The automatically recorded events may be available to the user on a streaming basis and may be available for viewing on demand after the original airing of the event allowing the user to "catch up" on programming they may have missed at the regular scheduled time or regular "on-air time." The programming events that are automatically recorded may be available as a "catch-up service," or as "catch-up events," and may be available for post-event streaming or otherwise available for streaming after their initial on-air time. The post-event streaming may allow users to view programming events on their television or other device for a specific time after the programming first aired without having to schedule recording of the event. The recording may be performed automatically by the service provider. In some embodiments, the stored events may be stored indefinitely or may be stored for a fixed time such as a week, a month, or a year.

In some embodiments, not all of the programming events may be automatically recorded and available for streaming after their initial event date. Only specific portions of the programming events may be available for streaming and/or on demand. In some embodiments, the programming events that are scheduled for automatic recording by the service provider may be identified to the user's television receiver and may be identified in the electronic programming guide to the user. Identifying which programming is scheduled for recording may provide the user with more flexibility and control over when and what to watch and/or record, and/or the like. In certain embodiments, programming that is designated to be available for streaming after the initial programming air date may be identified with metadata tags. The metadata may be attached to each program and transmitted using the EIT (Event Information Table) in ATSC (Advanced Television Systems Committee) or DVB (Digital Video Broadcasting) standards for example.

In some cases, certain programming events may be initial airings that have corresponding repeat showings planned for the future. In other cases, certain programming events may be repeat airings of previously aired programming events. Certain embodiments may take either or both types of such cases into account. For example, in the case of a conflict with a particular programming event at a first on-air time, certain embodiments may determine that there exists a planned repeat airing of the programming at a second time and that recording of the repeat airing instead of recording the previous airing is a potential solution to the conflict. As another example, in the case of considering a scheduled recording of a programming event that is determined to be a repeat airing, certain embodiments may search for a previous recording of the program. The previous recording could be local to the television receiver system of the user and/or the previous recording could be provided from a remote source, for example, via a streaming option.

In various embodiments, the television receiver may identify that a particular program is a repeat airing, that a repeat airing corresponding to a particular program is scheduled, and/or that a previous recording corresponding to a particular programs is available. Any one or combination of such alternative viewing options could be identified to the user's television receiver and/or in the electronic programming guide to the user, in certain embodiments. In certain embodiments, programming that is designated as a repeat airing, as having a corresponding scheduled repeat airing, and/or as having an already available corresponding streaming option may be identified with metadata tags. In some embodiments, in addition or in the alternative, the television receiver could be configured to search for alternative viewing options. The television receiver could search electronic programming guide information for indicia of a repeat airing, for example. With some embodiments, the television receiver could search previous recordings for a corresponding recording of a particular program. The television receiver, in certain embodiments, could pull information about alternative view options from a service provider. Certain embodiments may automatically implement a recording schedule that resolves the conflict. Certain embodiments may provide suggestions to the user of one or more potential conflict resolutions that, for example, may include recording of a repeat airing as an alternative to recording a previous airing.

Referring now to FIG. 1 an example media content distribution system 100 is shown in which aspects may be implemented, in accordance with certain embodiments of the present disclosure. For brevity, the system 100 is depicted in a simplified and conceptual form, and may generally include more or fewer systems, devices, networks, and/or other components as desired. Further, number and type of features or elements incorporated within the system 100 may or may not be implementation-specific, and at least some of the aspects of the system 100 may be similar to a cable television distribution system, an IPTV (Internet Protocol Television) content distribution system, and/or any other type of media or content distribution system.

The example system 100 may include a service provider 102, a satellite uplink 104, a plurality of orbiting (e.g., geosynchronous) satellites 106a-c, a satellite dish 108, a PTR (Primary Television Receiver) 110, a plurality of secondary television receivers 112a-b, a plurality of televisions 114a-c, and a plurality of computing devices 116a-b. In the present example, the PTR 110 may at least include a forward metadata management engine 118. The forward metadata management engine 118 may in one aspect be configured to receive metadata about the availability of programming events after their on-air showing.

The forward metadata management engine 118 could also be configured to receive metadata about other alternative viewing options such as repeat airings. In some embodiments, the forward metadata management engine 118 could also be backward-looking such that the engine 118 could be configured to receive metadata indicating repeat airings, whether a particular programming event is a repeat airing, whether there have been previous airings corresponding to the particular programming event, and/or whether there will be repeat airings corresponding to the particular programming event. In another aspect, the forward metadata management engine may be used for managing and scheduling of system resources taking into consideration the availability of programming events after their initial on-air showing.

The system 100 may also include at least one network 120 that establishes a bi-directional communication path for data transfer between and among the PTR 110, secondary television receivers 112a-b, televisions 114a-c, and computing devices 116a-b of the example system 100. In some embodiments, the network 120 may further establish a bi-directional communication path (not shown) for data transfer between the PTR 110 and the service provider 102. The network 120 is intended to represent any number of terrestrial and/or non-terrestrial network features or elements. For example, the network 120 may incorporate or exhibit any number of features or elements of various wireless and/or hardwired packet-based communication networks such as, for example, a WAN (Wide Area Network) network, a HAN (Home Area Network) network, a LAN (Local Area Network) network, a WLAN (Wireless Local Area Network) network, the Internet, a cellular communications network, and/or any other type of communication network(s) configured such that data may be transferred between and among respective elements of the example system 100.

The PTR 110, and the secondary television receivers 112a-b, as described throughout may generally be any type of television receiver, such as a STB (Set Top Box) for example. In another example, the PTR 110, and the secondary television receivers 112a-b, may exhibit functionality integrated as part of or into a television, a DVR, a computing device, such as a tablet computing device, or any other computing system or device, as well as variations thereof. Further, the PTR 110 and the network 120, together with the secondary television receivers 112a-b, televisions 114a-c, and computing devices 116a-b, may form at least a portion of a particular home computing network, and may each be respectively configured such as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-Bandwidth Digital Content Protection), etc.

In practice, the satellites 106a-c may be configured to receive uplink signals 122a-b from the satellite uplink 104. In this example, the uplink signals 122a-b may contain one or more transponder streams of particular data or content, such as particular television channel, that is supplied by the service provider 102. For example, each of the respective uplink signals 122a-b may contain various media content such a plurality of encoded HD (High Definition) television channels, various SD (Standard Definition) television channels, on-demand programming, programming information, and/or any other content in the form of at least one transponder stream, and in accordance with an allotted carrier frequency and bandwidth. In this example, different media content may be carried using different ones of the satellites 106a-c. Further, different media content may be carried using different transponders of a particular satellite (e.g., satellite 106a); thus, such media content may be transmitted at different frequencies and/or different frequency ranges. For example, a first and second television channel may be carried on a first carrier frequency over a first transponder of satellite 106a, and a third, fourth, and fifth television channel may be carried on second carrier frequency over a first transponder of satellite 106b, or, the third, fourth, and fifth television channel may be carried on a second carrier frequency over a second transponder of satellite 106a, and etc.

The satellites 106a-c may further be configured to relay the uplink signals 122a-b to the satellite dish 108 as downlink signals 124a-b. Similar to the uplink signals 122a-b, each of the downlink signals 124a-b may contain one or more transponder streams of particular data or content, such as various encoded and/or at least partially electronically scrambled television channels, on-demand programming, etc., in accordance with an allotted carrier frequency and bandwidth. The downlink signals 124a-b, however, may not necessarily contain the same or similar content as a corresponding one of the uplink signals 122a-b. For example, the uplink signal 122a may include a first transponder stream containing at least a first group or grouping of television channels, and the downlink signal 124a may include a second transponder stream containing at least a second, different group or grouping of television channels. In other examples, the first and second group of television channels may have one or more television channels in common. In sum, there may be varying degrees of correlation between the uplink signals 122a-b and the downlink signals 124a-b, both in terms of content and underlying characteristics.

Continuing with the example implementation scenario, the satellite dish 108 may be provided for use to receive television channels, such as on a subscription basis, provided by the service provider 102, satellite uplink 104, and/or satellites 106a-c. For example, the satellite dish 108 may be configured to receive particular transponder streams, or downlink signals 124a-b, from one or more of the satellites 106a-c. Based on the characteristics of the PTR 110 and/or satellite dish 108, however, it may only be possible to capture transponder streams from a limited number of transponders concurrently. For example, a tuner of the PTR 110 may only be able to tune to a single transponder stream from a transponder of a single satellite, such as satellite 106a, at a time.

Additionally, the PTR 110, which is communicatively coupled to the satellite dish 108, may subsequently select via tuner (see e.g., FIG. 3), decode, and relay particular transponder streams to the television 114c for display thereon. For example, the satellite dish 108 and the PTR 110 may, respectively, be configured to receive, decode, and relay at least one premium HD-formatted television channel to the television 114c. Programming or content associated with the HD channel may generally be presented "live," or from a recording as previously stored on, by, or at the PTR 110. In this example, the HD channel may be output to the television 114c in accordance with the HDMI/HDCP content protection technologies. Other embodiments are possible. For example, in some embodiments, the HD channel may be output to the television 114c in accordance with the MoCA® (Multimedia over Coax Alliance) home entertainment networking standard. Still other embodiments are possible.

Further, the PTR 110 may select via tuner, decode, and relay particular transponder streams to one or both of the secondary television receivers 112a-b, which may in turn relay particular transponder streams to a corresponding one of the television 114a and the television 114a for display thereon. For example, the satellite dish 108 and the PTR 110 may, respectively, be configured to receive, decode, and relay at least one television channel to the television 114a by way of the secondary television receiver 112a. Similar to the above-example, the television channel may generally be presented "live," or from a recording as previously stored on the PTR 110, and may be output to the television 114a by way of the secondary television receiver 112a in accordance with a particular content protection technology and/or networking standard. Other embodiments are possible.

Still further, the satellite dish 108 and the PTR 110 may, respectively, be configured to receive, decode, and relay at least one premium television channel to one or both of the computing devices 116a-b. Similar to the above-examples, the television channel may generally be presented "live," or from a recording as previously stored on the PTR 110, and may be output to one or both of the computing devices 116a-b in accordance with a particular content protection technology and/or networking standard. Other embodiments are possible.

Figure 2:
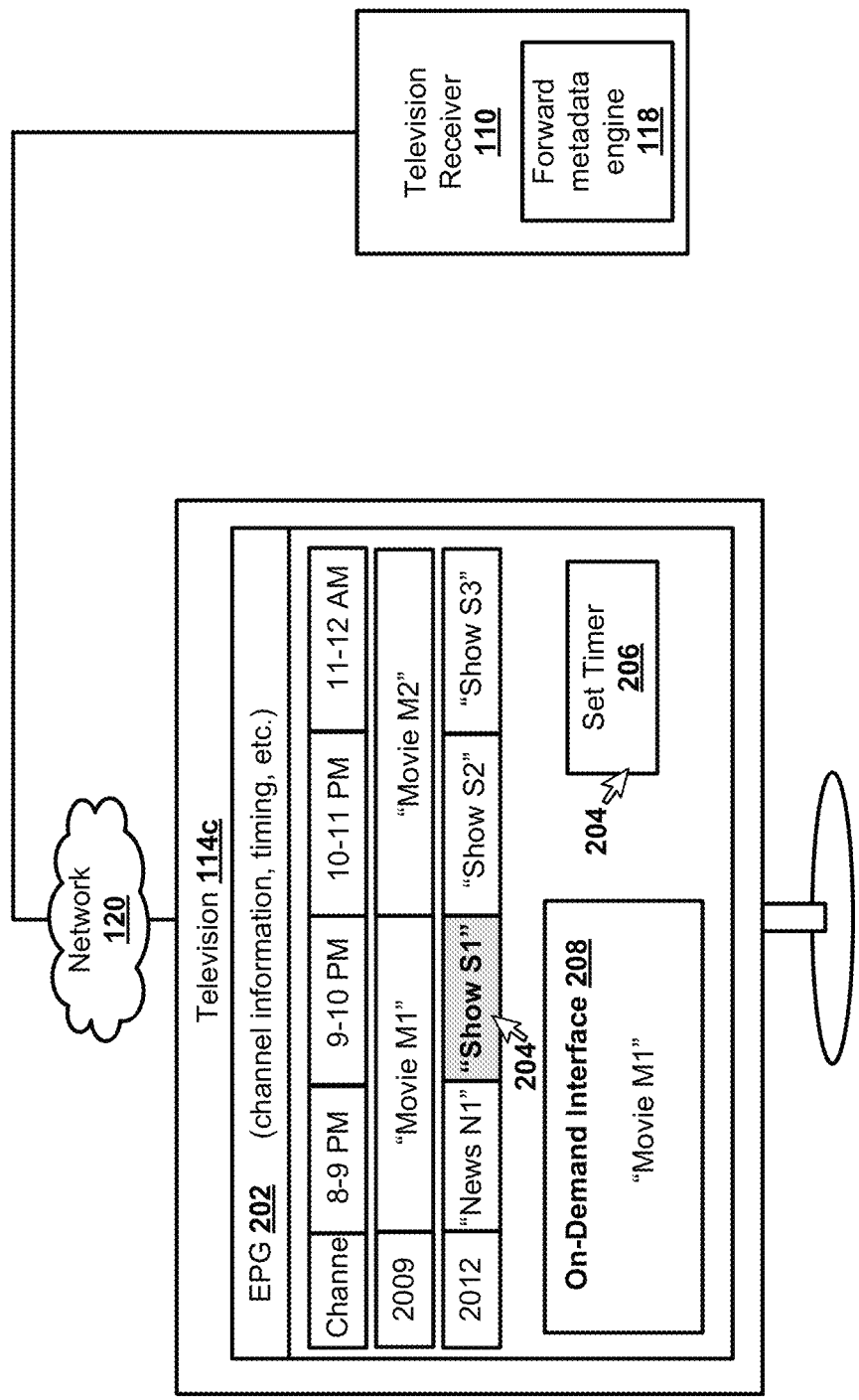
FIG. 2 shows aspects of the example system of FIG. 1 in further detail, in accordance with certain embodiments of the present disclosure.

Referring now to FIG. 2, aspects of the example system 100 of FIG. 1 are shown in further detail, in accordance with certain embodiments of the present disclosure. In particular, the PTR 110 may be configured to output an EPG (Electronic Programming Guide) 202 to and for presentation by at least the television 114c. The EPG 202 may at least present various information related to television channels and the timing of programs or programming appearing on such television channels, such as television channels as received from one or more of the satellites 106a-c. For example, the EPG 202 may display channel information associated with a channel "2012," where a "Show S1" is listed as scheduled to appear on the channel "2012" during a particular time period "9-10 PM" of a particular day, etc. In this example, and assuming that a current time is some time during the time period "9-10 PM" of a particular day, a user may manipulate a cursor 204 using a pointing device (not shown) to select the "Show S1" for immediate viewing on the television 114c. Other embodiments are possible. For example, it is envisioned that any means consistent with menu-driven navigation may be used to interact with the EPG 202, and respective elements of the EPG 202.

The EPG 202 may further display or otherwise present a first user-selectable icon 206 that may be selected to set a recording timer to automatically record a particular program for later viewing. In this example, the PTR 110 may exhibit DVR functionality to record programs or programming appearing on various channels as received from satellites 106a-c. For example, and assuming that a current time is some time prior the time period "9-10 PM," such as a current time within the time period "8-9 PM" preceding the "9-10 PM" time period, a user may manipulate the cursor 204 to select the "Show S1" as displayed within the EPG 202 for recording by the PTR 110 for later viewing one or more of the televisions 114a-c and the computing devices 116a-b.

In some embodiments, the forward metadata management engine 118 may in one aspect be configured to receive metadata about the availability of programming events after their on air showing. For example, a user may wish to schedule for recording and later viewing the "Show S1" and the "Movie M1." In order for this to be performed, at least two tuners of the PTR 110 would need to be available at the prescribed time "9-10 PM." However, if at least two tuners are not available to record the two programs, the request may not be able to be performed. In accordance with the present disclosure, the forward metadata management engine 118 may be configured to determine that the "Movie M1" will at some time in the future be available for "on-demand" viewing. This is shown in FIG. 2 by or in the example interface 208. In this example, the forward metadata management engine 118 may make a suggestion to the user to record the "Show S1," since the "Movie M1" will be available for later viewing.

The forward metadata may be directed for programming events in the future. As will be described in more detail below, the metadata may include information as to the availability of programming events after their initial (over the air) on-air time. Some programming events may be recorded by one or more service providers (e.g., such as a primary service provider and a third-party service provider) and available for streaming after the initial on-air time. The forward metadata management engine 118 may be used for managing and scheduling of system resources, taking into consideration the availability of programming events after their initial on-air showing. In some embodiments, the forward metadata may be directed to repeat airings in the future. The forward metadata, for example, could indicate whether there will be repeat airings corresponding to the particular programming event. As discussed further herein, in some embodiments, the management engine 118 could also be configured to be backward-looking such that the engine 118 could be configured to process metadata indicating repeat airings and to determine whether a particular programming event is a repeat airing, whether there have been previous airings corresponding to the particular programming event, and/or whether there will be repeat airings corresponding to the particular programming event.

Figure 3:
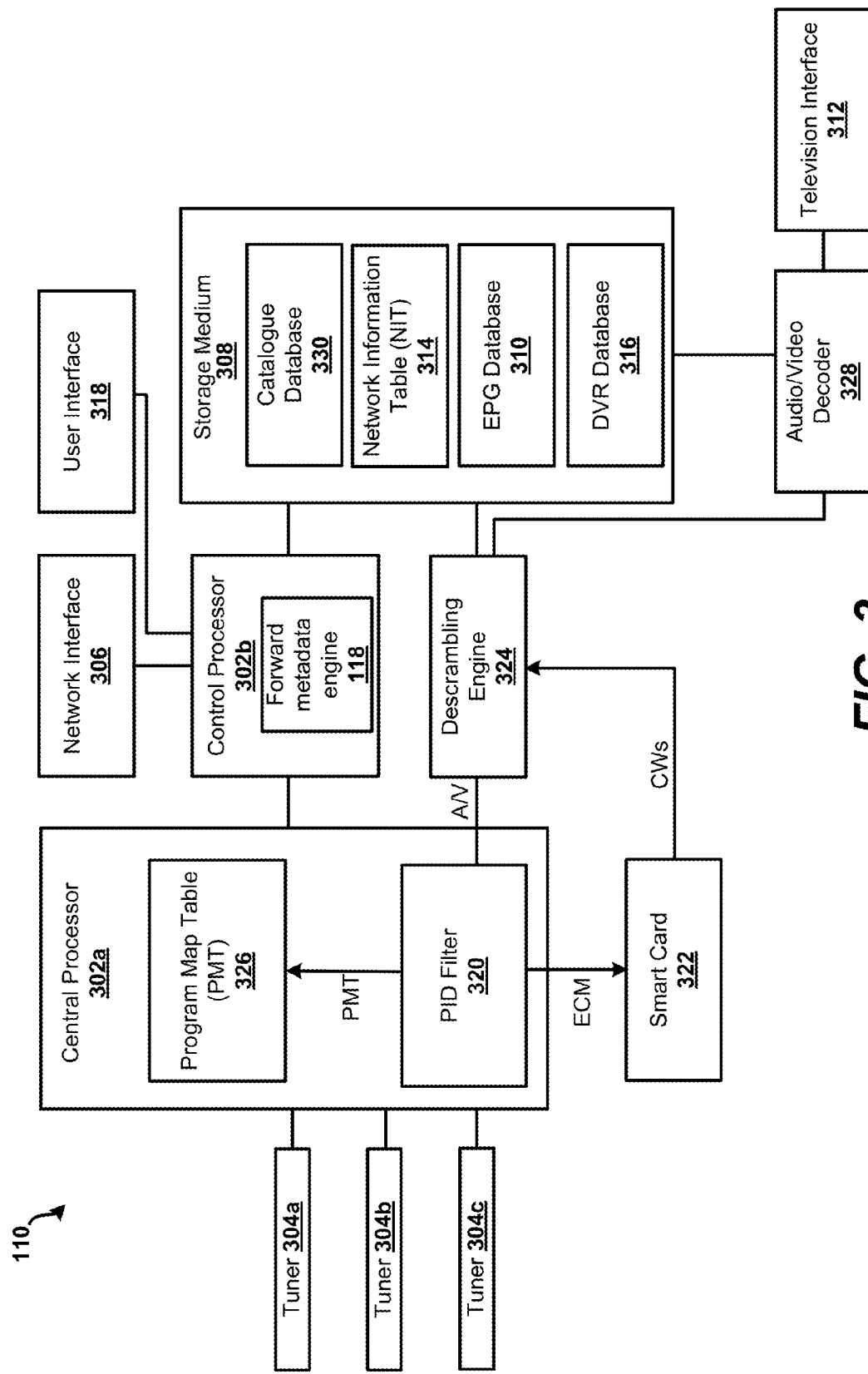
FIG. 3 shows a simplified block diagram of a television receiver of FIG. 1, in accordance with certain embodiments of the present disclosure.

Referring now to FIG. 3, a simplified block diagram of the PTR 110 of FIG. 2 is shown, in accordance with certain embodiments of the present disclosure. In some embodiments, at least one of the secondary television receivers 112a-b may be configured in a manner similar to that of the PTR 110. In other embodiments, at least one of the secondary television receivers 112a-b may be configured to exhibit a reduced functionality as compared to the PTR 110, and may depend at least to a certain degree on the PTR 110 to implement certain features or functionality. In this example, the secondary television receivers 112a-b may be referred to as a "thin client."

For brevity, the PTR 110 is depicted in a simplified and conceptual form, and may generally include more or fewer elements or components as desired in accordance with the present disclosure. For example, the PTR 110 is shown in FIG. 3 to include the forward metadata management engine 118 as mentioned above in connection with FIG. 1. Additionally, although not explicitly shown in FIG. 3, the PTR 110 may include one or more logical modules configured to implement a television steaming media functionality that encodes video into a particular format for transmission over the Internet such as to allow users to remotely view and control a home cable, satellite, or personal video recorder system from an Internet-enabled computer with a broadband Internet connection. The Slingbox® by Sling Media, Inc. of Foster City, Calif., is one example of a product that implements such a functionality. Additionally, the PTR 110 may be configured to include any number of other various components or logical modules that are implemented in hardware, software, firmware, or any combination thereof, and such components or logical modules may or may not be implementation-specific.

In some embodiments, the PTR 110 and/or the secondary television receivers 112a-b comprise of a STB. In addition to being in the form of an STB, at least the PTR 110 may be incorporated into another device, such as the television 114c. For example, the television 114c may have an integrated television receiver that does not involve an external STB being coupled with the television 114c. A STB may contain some or all of the components of the PTR 110 and/or may be able to perform some or all of the functions of the PTR 110. Accordingly, instances in this document referring to a STB, and steps being performed by a STB, may also be performed, more generally, by the PTR 110 and/or secondary television receivers 112a-b.

Referring still to FIG. 3, the PTR 110 may be configured to receive forward metadata about the availability of programming events after their on-air showing, forward metadata about repeat airings of programming events, metadata about current streaming options, and/or the like. The PTR 110 may include the forward metadata management engine 118 as shown in FIG. 2, at least one processor 302, including a central processor 302a and a control processor 302b, a plurality of tuners 304a-c, at least one network interface 306, at least one non-transitory computer-readable storage medium 308, at least one EPG database 310, at least one television interface 312, an NIT (Networking Information Table) 314, at least one DVR database 316, at least one user interface 318, a PID filter 320, at least one smart card 322, a descrambling engine 324, a PMT (Program Map Table) 326, at least one decoder 328, and a catalogue database 330. In other embodiments of the PTR 110, fewer or greater numbers of components may be present. Further, functionality of one or more components may be combined; for example, functions of the descrambling engine 324 may be performed by the central processor 302a. Still further, functionality of components may be spread among additional components. For example, the PID filter 320 may be handled by hardware and/or software separate from the PMT 326.

The processor 302 may include one or more specialized and/or general-purpose processors configured to perform processes such as tuning to a particular channel, accessing and displaying EPG information from the EPG database 310, and/or receiving and processing input from a user. For example, processor 302 may include one or more processors dedicated to decoding video signals from a particular format, such as MPEG (Moving Picture Experts Group), for output and display on a television and for performing decryption.

The control processor 302b may communicate with the central processor 302a. The control processor 302b may control the recording of television channels based on timers stored in the DVR database 316. The control processor 302b may initiate recording of a television channel by sending a record command along with an indication of the television channel to be recorded to the central processor 302a. The control processor 302b may not send a second record command, when additional recording is to begin at the same time, until an acknowledgement that recording of the first television channel has successfully been received and initiated by the central processor 302a. The control processor 302b may also provide commands to the central processor 302a when recording of a television channel is to cease. In addition to providing commands relating to the recording of television channels, the control processor 302b may provide commands to the central processor 302a that indicate television channels to be output to the decoder 328 for output to a presentation device, such as the television 114c for example.

The control processor 302b may also communicate with the network interface 306 and the user interface 318. The control processor 302b may handle incoming data from the network interface 306 and the user interface 318. Additionally, the control processor 302b may be configured to output data via the network interface 306.

The tuners 304a-c may be used to tune to television channels, such as television channels transmitted via satellite or cable, such as satellites 106a-c. Each respective one of the tuner 304a-c may be capable of receiving and processing a single stream of data from a satellite transponder, or a cable RF channel, at a given time. As such, a single tuner may tune to a single transponder or, for a cable network, a single cable RF channel. Additionally, one tuner (e.g., tuner 304a) may be used to tune to a television channel on a first transponder stream for display using a television, while another tuner (e.g., tuner 304b) may be used to tune to a television channel on a second transponder for recording and viewing at some other time. Still another tuner (e.g., tuner 304c) may be used to check various television channels to determine if they are available or not. If multiple television channels transmitted on the same transponder stream are desired, a particular tuner (e.g., tuner 304a) may be used to receive the signal containing the multiple television channels for presentation and/or recording. The tuners 304a-c may receive commands from the central processor 302a. Such commands may instruct the tuners 304a-c which frequencies are to be used for tuning.

The network interface 306 may be used to communicate via an alternate communication channel with a television service provider. For example, the primary communication channel may be via satellite, which may be unidirectional to the STB, and the alternate communication channel, which may be bi-directional, may be via a network, such as the Internet. The PTR 110 may be able to communicate with the service provider 102 of FIG. 1 via a network, such as the Internet. This communication may be bidirectional. For example, data may be transmitted from the PTR 110 to the service provider 102, and from the service provider 102 to the PTR 110. The network interface 306 may be configured to communicate via one or more networks, such as the Internet, to communicate with the service provider 102. Information may be transmitted and/or received via the network interface 306.

The storage medium 308 may represent a non-transitory computer-readable storage medium. The storage medium 308 may include memory and/or a hard drive. The storage medium 308 may be used to store information received from one or more satellites and/or information received via the network interface 306. The storage medium 308 may store information related to the EPG database 310, the NIT 314, and/or the DVR database 316. Recorded television programs may be stored using the storage medium 308. The storage medium 308 may be partitioned or otherwise divided such that predefined amounts of the storage medium 308 are devoted to storage of omnibus channel files and user-selected television programs.

The EPG database 310 may store information related to television channels and the timing of programs appearing on such television channels. The EPG database 310 may be stored using the storage medium 308, which may be a hard drive. Information from the EPG database 310 may be used to inform users of what television channels or programs are popular and/or provide recommendations to the user. Information from the EPG database 310 may provide the user with a visual interface (e.g., EPG 202) displayed by a television that allows a user to browse and select television channels and/or television programs for viewing and/or recording. Information used to populate the EPG database 310 may be received via the network interface 306 and/or via satellites, such as satellites 106a-c of FIG. 1 via the tuners 304a-c. For instance, updates to the EPG database 310 may be received periodically via satellite. The EPG database 310 may serve as an interface for a user to control DVR functions of the PTR 110, and/or to enable viewing and/or recording of multiple television channels simultaneously.

In addition to being used to provide users with information about scheduled programming, information from the EPG database 310 may be used to determine when television programs begin and end for the purposes of recording. For instance, when a channel-specific file is recorded that contains multiple television channels, the start and end of time of specific television programs within the channel-specific file may be based on the start and end times indicated in the EPG database 310. Other data may be stored within the EPG database 310 that may be useful in managing channel-specific files, such as series identifiers and episode identifiers, which may be used by a television service provider to identify particular television programs.

The decoder 328 may serve to convert encoded video and audio into a format suitable for output to a display device. For instance, the decoder 328 may receive MPEG video and audio from the storage medium 308, or the descrambling engine 324, to be output to a television. MPEG video and audio from the storage medium 124 may have been recorded to the DVR database 316 as part of a previously-recorded television program. The decoder 328 may convert the MPEG video and audio into a format appropriate to be displayed by a television or other form of display device and audio into a format appropriate to be output from speakers, respectively.

The television interface 312 may serve to output a signal to a television, or another form of display device, in a proper format for display of video and playback of audio. As such, the television interface 312 may output one or more television channels, stored television programming from the storage medium 308, such as television programs from the DVR database 316 and/or information from the EPG database 310 for example, to a television for presentation.

A DVR may permit a television channel to be recorded for a period of time. DVR functionality of the PTR 110 may be managed by the control processor 302b. The control processor 302b may coordinate the television channel, start time, and stop time of when recording of a television channel is to occur. The DVR database 316 may store information related to the recording of television stations. The DVR database 316 may store timers that are used by the control processor 302b to determine when a television channel should be tuned to and its programs recorded to the DVR database 316. However, other embodiments are possible. For example, in some embodiments, the storage medium 308 may store timers. A recording queue and/or recording schedule may be maintained and may include scheduling information, resource allocation information about tuner, recorder, timer, and/or the like resources and about mapping of resources to particular programming events, channels, times, dates, and/or the like.

DVR functionality of the control processor 302b may have multiple modes. For example, DVR functionality of the control processor 302b may be configured to record individual television programs selected by a user to the DVR database 316. Using the EPG database 310, a user may select a particular television program. Based on the date, time period, and television channel indicated by the EPG database 310, the control processor 302b may record the associated television program to the DVR database 316. In another example, the DVR database 316 may be used to store recordings of predefined periods of time on one or more television channels. These predefined periods of time may include one or more television programs. For example, Primetime on a particular television network may be recorded each weekday night. Further, multiple television channels may be recorded for such predefined periods of time. Such recording of television channels for predefined periods of time may be defined by a television service provider (e.g., service provider 102).

As an example of this second mode of DVR functionality, a television service provider may configure the PTR 110 to record television programming on multiple, predefined television channels for a predefined period of time, on predefined dates. For instance, a television service provider may configure the PTR 110 such that television programming may be recorded from 7 PM to 10 PM on the NBC, ABC, CBS, and FOX networks each weeknight. When a television program is selected for recording by a user and is also specified for recording by the television service provider, the user selection may serve as an indication to save the television program for an extended time, beyond the time which the predefined recording would otherwise be saved.

The user interface 318 may include a remote control, physically separate from PTR 110, and/or one or more buttons on the PTR 110 that allows a user to interact with the PTR 110. The user interface 318 may be used to select a television channel for viewing, view information from the EPG database 310, and/or program a timer stored to the DVR database 316 wherein the timer may be used to control the DVR functionality of the control processor 302b.

For simplicity, the PTR 110 of FIG. 3 has been reduced to a block diagram; commonly known parts, such as a power supply, have been omitted. Further, some routing between the various modules of PTR 110 has been illustrated. Such illustrations are for exemplary purposes only. The state of two modules not being directly or indirectly connected does not indicate the modules cannot communicate. Rather, connections between modules of the PTR 110 are intended only to indicate possible common data routing. It should be understood that the modules of the PTR 110 may be combined into a fewer number of modules or divided into a greater number of modules. Further, the components of the PTR 110 may be part of another device, such as built into a television. Also, while the PTR 110 may be used to receive, store, and present television channels received via a satellite, it should be understood that similar components may be used to receive, store, and present television channels via a cable network.

Figure 4:
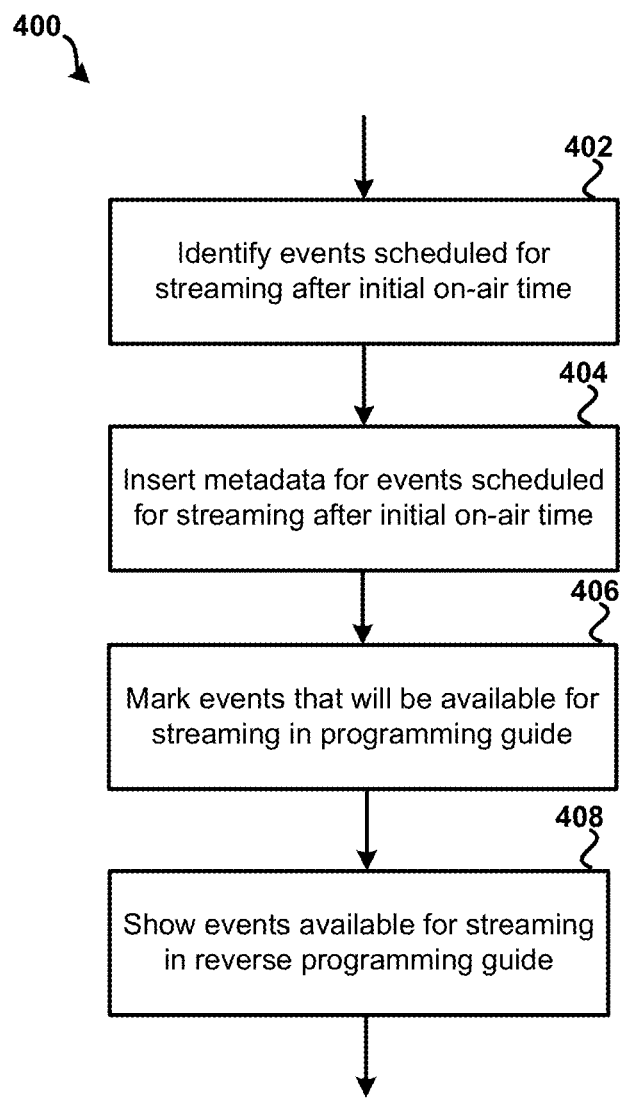
FIG. 4 shows a first example method, in accordance with certain embodiments of the present disclosure.

Referring now to FIG. 4, a first example method 400 is shown in accordance with the present disclosure. In general, method 400 describes a process by which metadata is defined for programming. In particular, programming events may be marked or otherwise identified as available for streaming after their initial "on-air time" or regular time when the event was shown over the air. As described above, some events may be automatically recorded by the system and/or may be service-provided and made available to the user on an on-demand streaming basis without input from the user.

The programming which will be available for streaming may be identified by the system at 402. The programming may be identified by the broadcaster, by one or more service providers, and/or the like. In some embodiments, the programming events may be available from different service providers. The programming events that may be available for streaming may be identified with metadata before their initial on-air time, or identified with metadata at the start or during their initial on-air time. The metadata may be associated with, and inserted for, the programming event scheduled for automatic recording at 404 by the one or more service providers. The metadata may be transmitted to the user with the EPG data, over the air with each program event, separately from the EPG data, and/or the like.

The metadata may include various information regarding the programming event. The metadata may include information about the expected time of availability of the recorded programming event, the length, the expected quality of video and audio encoding, the service provider associated with the recording, availability, and/or the like.

Examples of forward metadata are the EIT event_information_section( ) [1] in DVB SI, or event_information_table_section( ) [2] in the ATSC system. The metadata structure may contain the metadata required to directly provide the redirection either directly to the content file for delivery or to a webpage from which the link to the content file may be made.

An example of a possible descriptor structure that could be included in (but not limited to) an EIT section is shown below.

| Syntax | Number of bits | Identifier |
| --- | --- | --- |
| advance_catch_up_descriptor( ) | | |
| { | | |
|    descriptor_tag | 8 | uimsbf |
|    descriptor_length | 8 | uimsbf |
|    unique_event_id | 32 | uimsbf |
|    available_time | 64 | bslbf |
|    for (j=0;j<N;j++){ | | |
|      uri_char | 8 | uimsbf |
|    } | | |
| } | | |

The "descriptor_tag" may be the descriptor tag and may be an 8-bit field which identifies each descriptor. The "descriptor_length" may be the descriptor length and may be an 8-bit field specifying the total number of bytes of the data portion of the descriptor following the byte defining the value of this field. The "unique_event_id" may be a tag that uniquely describes an event within the EPG. In DVB, unique events can be identified via the service_id and event_id defined in the EIT event_information_section( ). In ATSC, unique events can be identified via the source_id and event_id as defined by the event_information_table_section( ). The "available_time" may be a 64-bit field that represents the time that the event media will be available for download. The "uri_char" may be an 8-bit field, a sequence of which conveys a Uniform Resource Identifier (URI) that contains the defined location of the media data or a portal to that data.

Returning back to FIG. 4, using the metadata, the programming events that will be available for streaming may be marked in the EPG at 406. The events may be marked with different color, icons, pixels, highlights, texts, and/or the like. The marked events may be marked so that they are not distinguishable from non-marked events to the user by viewing the EPG but may still be distinguishable by the system and processor to perform user recording and/or scheduling tasks. The metadata of the programming event that is recorded and is available via on-demand streaming may be saved and presented in a reverse EPG at 408. The EPG may show a schedule that occurred in the past, a "reverse programming guide," and show which programming events from the past schedule are available on-demand and/or via streaming. A user may, therefore, scroll back in time through the EPG and find their favorite show that they missed and want to watch. That show, if available for streaming, may then be watched on demand by the user.

The metadata information identifying which programming events will be available for streaming after the event's initial on-air time may be used by the DVR, recording, and/or scheduling aspects of the system and/or used by the forward metadata engine. In a DVR system, the system may be constrained by the resources of the system as to the number of parallel programming streams or the number of hours of programming that the system allows the user to record and save locally. The information as to the availability of the streaming programming event after the airing of the event may be used to adjust, modify, or otherwise change the recording and/or other viewing schedules. The recording schedules may be modified with the information regarding the availability of streaming programming event to ensure that as much of the programming the user wishes to save for a later time is available taking into account the resource constraints of the users DVR resources.

In some embodiments, additionally or alternatively, the method 400 may include handling of programming events that have corresponding repeat showings. The programming events considered could have corresponding repeat showings planned for the future, and/or the programming events could be repeat showings. Accordingly, such programming may be identified, marked, and presented, and metadata may be inserted therefor, in similar manner to the identification events scheduled for streaming described herein.

Figure 5A:
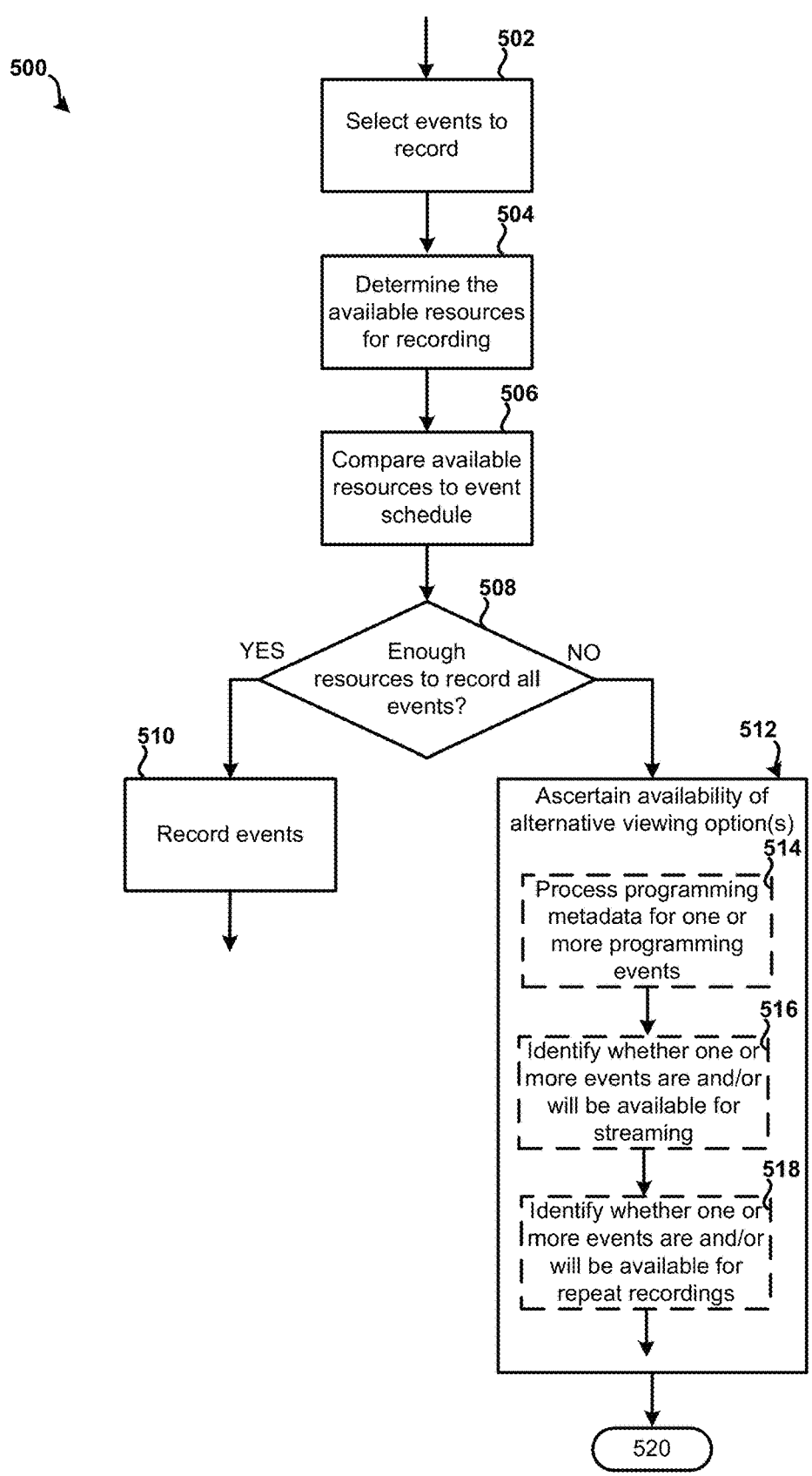
FIGS. 5A and 5B shows a second example method, in accordance with certain embodiments of the present disclosure.
Figure 5B:
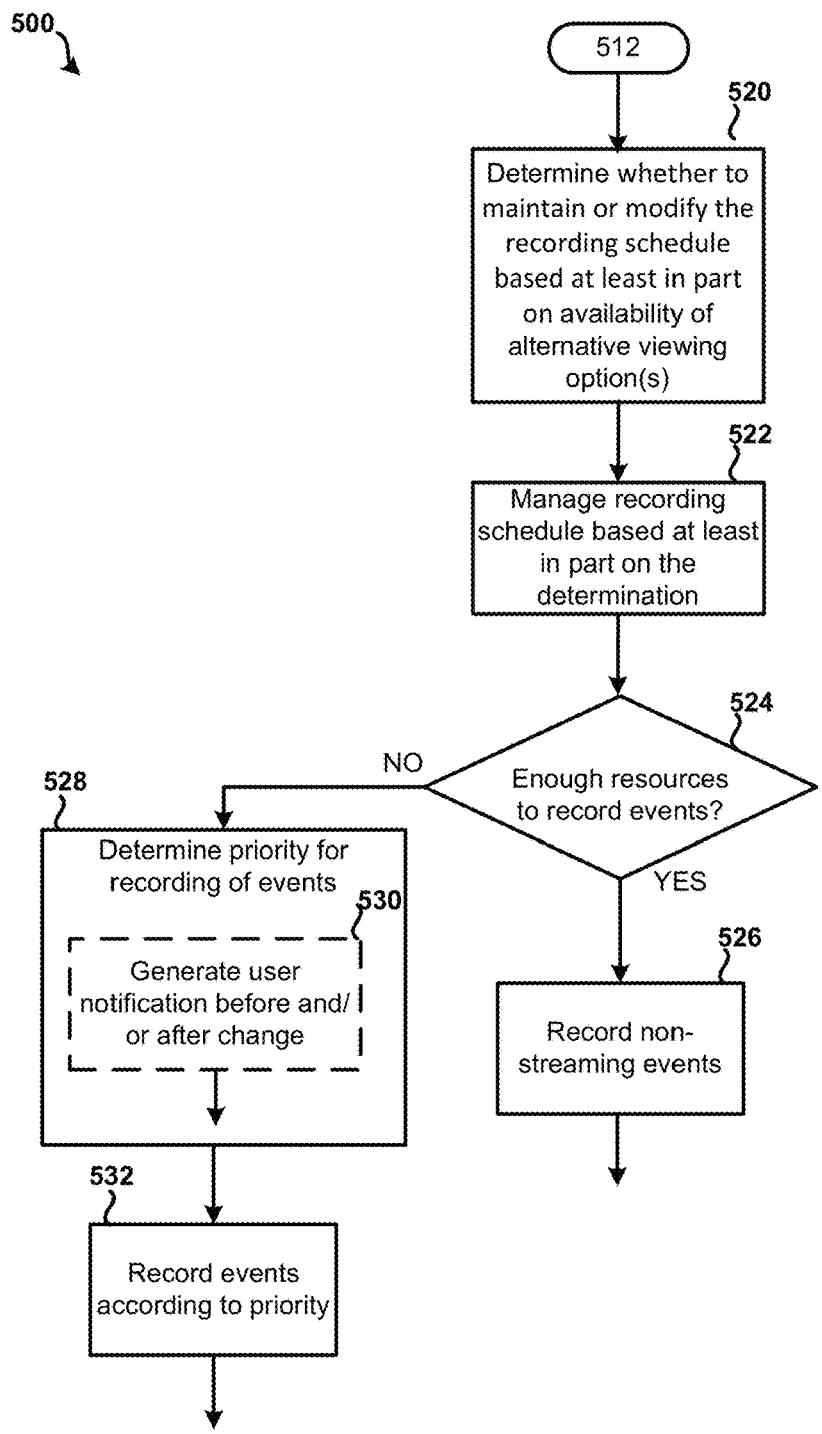

Referring now to FIG. 5, a second example method 500 in accordance with the present disclosure. In general, method 500 shows how metadata may be used in scheduling and recording of program events. In particular, a television receiver may receive an indication of a selection by a user for programming events to record at 502 or otherwise save to watch for a time other than the time of the initial airing of the event. The indication at 502 may be in response to a user's action or based on user preferences, options, history, and/or the like.

The system may determine the resources available for recording the selected programming events at 504. The resources may be limited or otherwise constrained by the number of simultaneous programming events that may be recorded, the number of hours of programming that may be recorded, the quality of the recording, and/or the like. In some embodiments, the schedule of the events selected by the user may not be compatible with the resources available to the user's system in order to save the programming events locally. For example, the user may be requesting to save or record three programming events simultaneously when the hardware of his system may only be capable of recording two. In some cases, the resources available for recording may be constrained by a one or more streams being tuned to and/or content being processed and presented via one or more displays. Thus, certain embodiments may address recording conflicts that involve one or more recordings conflicting with the presentation of programming content for viewing, which conflicts may not necessarily involve one recording conflicting with another recording.

A comparison of the available resources to the programming event schedule and requirements may be made at 506, 508. If the event schedule is compatible with the resources, the recording may commence at 510. If the schedule is incompatible with the schedule, the system may still satisfy the users desire to watch the events at a later date by not recording the events that will be available for streaming.

As indicated by block 512, one or more alternative viewing options may be identified. As indicated by block 514, programming metadata for one or more programming events may be processed. Additionally or alternatively in some embodiments, the television receiver could pull information about alternative view options from a service provider. With some embodiments, one or more of the alternative viewing options may correspond to one or more streaming options for the programming. For example, looking at the metadata, the system may identify the programming events in the user's schedule which are and/or will be available for streaming at 516. In some cases, a streaming option may be available later, for example, when a program of interest corresponds to an initial airing. In other cases, a streaming option may already be available, for example, when a program of interest corresponds to a repeat airing. The system may provide a link to the streaming resource in the user's record history. In some embodiments, additionally or alternatively, one or more of the alternative viewing options may correspond to one or more stream-and-record-later options for the programming. Where a stream-and-record-later option(s) exist, the system could be configured to receive and record a stream of the program of interest from the service provider at a time when the system has resources to record the stream.

In some embodiments, additionally or alternatively, one or more of the alternative viewing options may correspond to one or more record-a-repeat options for the programming, as indicated by block 518. For example, looking at the metadata, the system may identify that a repeat airing corresponding to a particular program that is scheduled for a time when the system has resources to record the stream. Having identified the later repeat, the recording schedule could be adjusted to record the later repeat. In some embodiments, in addition or in the alternative, the system could be configured to search for alternative viewing options. The television receiver could search electronic programming guide information for indicia of a repeat airing, for example. With some embodiments, the television receiver could search previous recordings for a corresponding recording of a particular program. More specifically, the system may also be configured to identify whether a particular program is a repeat airing and to search for whether a previous recording corresponding to the particular program is available. Say, for example, a user has set to record a series of episodes corresponding to particular programming, including repeats. The system may identify such recording instructions and may search to determine whether a particular episode has already been recorded; if so, the repeat airing involved in the recording conflict need not be recorded, as it would be a duplicate.

In some embodiments, the ascertainment of availability of alternative viewing options may be based on recording conflict rules that could, for example, dictate the process according to which alternative viewing options are identified. By way of example without limitation, some embodiments may first check as to whether a given program is a repeat and, if so, whether a previous recording exists and, if so, it may be determined that the conflicting scheduled recording may be canceled; if not, it may then be determined whether a repeat of the given program is scheduled during a future time when resources are available according to the recording schedule. If such a repeat is not identified, then it may be determined whether a streaming option is available. The conflict rules could implement a different type of process, which could be implemented as a decision tree in some embodiments. The conflict rules could also dictate the process by which information is searched. By way of example without limitation, some embodiments may first process metadata, if any, then search EPG information, and then pull information from a service provider.

As indicated by block 520, whether to maintain or modify the recording schedule based at least in part on the determined availability of alternative viewing option(s). Such determination may be based at least in part on one or more conflict handling rules. For example, with certain embodiments, one or more conflict handling rules may provide for user notification and/or user selection. Specifically, the determination of whether to maintain or modify the recording schedule could be based at least in part on user selection. Having identified one or more alternative viewing options, a user notification regarding the resource conflict and a suggestion of a conflict resolution may be generated. The user notification could be presented via the user interface with the display device, for example. One or more user-selectable options could be presented along with the suggestion to allow the user to choose how to adjust the recording schedule. And the recording schedule could be managed responsive to one or more user selections. However, certain embodiments may automatically implement a recording schedule that resolves the conflict and, optionally, notify the user as to the automatically implemented resolution with an option to override the resolution.

As indicated by block 522, the recording schedule may be managed based at least in part on the determination of whether to maintain or modify the recording schedule. For example, one or more scheduled recordings may be canceled if such are causing conflict in view of the available resources and if one or more alternative viewing options are selected. As another example, one or more scheduled recordings may be newly scheduled if applicable alternative viewing options are selected. In certain cases, the recording schedule may be maintained where, for example, the conflict arise as a user is in the process of scheduling a program for recording, a suggestion of a conflict resolution is presented, where the suggestion does not involve additional recording (say, streaming without recording) and the user accepts the suggestion.

As indicated by block 524, it may be determined whether there are enough resources to records events. In some cases, the events could correspond to non-streaming events and/or other events for which alternative viewing options do not exist. In some cases, the events could correspond to events for which alternative viewing options do exist, but the management of the recording schedule in view of identified alternative viewing options could have reduced resource demand to match or otherwise fall within resource capabilities. For example, removing and/or not adding one or more programming events to the recording schedule may have reduced the schedule to the resources available. Where sufficient resources exist, the system may record the events, as indicated by block 526. In some case, this may mean recording only the non-streaming events.

If, however, there are still not enough resources to satisfy the user's recording request, a priority may be determined for the events, as indicated by block 528. In some embodiments, the system may generate a user notification before and/or after changing the recording schedule, as indicated by block 530. The system may prompt the user to prioritize and/or remove some programming events from the schedule. In some embodiments, the system may automatically prioritize and/or remove some programming events from the schedule based on recording conflict rules, and optionally generate a user notification with a user-selectable override option. In some embodiments, the system may provide one or more notifications to users prior to a change to inform the user of the change. Such notifications may be presented at the television receiver and/or via the coupled television display. As indicated by block 532, one or more events may be recording according to the priority. In some cases, the priority may be dictated by the user's preferences or input.

As an example of a potential change based on the recording conflict rules, a special feature of default recording of prime time content may be canceled. But, in some embodiments, the system may not cancel the special feature if the user has specifically selecting the prime time recording or regardless of user selection. In some embodiments, the system may make determinations of whether to temporarily cancel scheduled recordings based on user history. If previously recorded content corresponding to the scheduled recording specifically (e.g., previous corresponding episodes) have not been viewed, a scheduled recording may be canceled. Some embodiments could employ one or more thresholds to make the determination. An unviewed recording threshold could be used such that the scheduled recording may be canceled if the number of unviewed recordings meets or exceeds the unviewed recording threshold. Accordingly, the system may infer that the recorded content is of lesser importance to the user. Additionally or alternatively, the system could determine whether a pattern of the user is viewing the recording content. Say, for example, a series of recordings correspond to a series of episodes for a particular program, and the television receiver determines that the user is sequentially viewing the recording episodes. In such a scenario, the television receiver may infer that the user, and though perhaps "behind" in viewing recent episodes, is highly interested in the content. The television receiver may then determine that the scheduled recording should not be canceled. In some embodiments, this pattern determination could override a determination based on the unviewed recording threshold.

In some embodiments, the system may optionally notify the user that some of the events, if applicable, may be available for streaming at a later date and therefore there is no need to perform recording locally even if the system has enough resources to record. The system may have an optional setting allowing the user to set preferences as to when to record or to never record locally if the event will be available for streaming from a service provider.

FIG. 6A and FIG. 6B show an example EPG and user recording schedule which may be modified based on forward metadata identifying programming events that will be available for streaming, in accordance with certain embodiments of the present disclosure. In FIG. 6A, an example EPG is shown for four stations (BBC1, BBC2, ITV1, Channel 4). The sequential programming events that are associated with each station are listed in each row next to each station. For example, programming events 1.1, 1.2, 1.3, and 1.4 are shown sequentially for station BBC1.

Based on forward metadata, the system may identify and optionally highlight the programming events in the EPG that are scheduled to be automatically recorded by one or more system providers for "catch-up viewing" and/or on-demand streaming after the air time. For example, in FIG. 6A, programming events 2.1 and 3.3 are highlighted and identified as scheduled to be automatically recorded and will be available for streaming at a later time. Based on user input, preferences, history, and/or the like programming events 1.4, 2.2, and 3.3 may be scheduled for recording. This recording schedule means that, at one point, three different programming events will need to be recorded simultaneously. If a user's equipment is only capable of recording two streams simultaneously, the request cannot be satisfied. However, looking at the metadata of the programming events, it is possible to determine that programming event 3.3 will be recorded by the system and available for streaming on demand. The system may alter the recording schedule to ensure that all three of the programming events are available to the user for viewing after their initial on air-time.

In one embodiment, the system may not record programming 3.3 and may only record programming event 1.4 and 2.2 as shown in FIG. 6B. Programming event 3.3 may be made available to the user after the initial on-air time via a streaming service. In another embodiment, the system may record programming 1.4 and 2.2 as they are aired locally. The system may then wait until the two events have been recorded, at which point, the system may stream the programming event 3.3 which was recorded by the service provider, and the television receiver may record the stream locally on a DVR or the like for access by the user at a later time. Accordingly, the service provider may provide a temporary extension of recording capabilities in some embodiments.

The programming event's future streaming availability may also be used to influence a user's viewing schedule. In some embodiments, the system may not have a capability to locally store or record programming. Users are often conflicted as to what to view when more than one programming event of interest is shown simultaneously. If the user is able to see which events will be available for streaming, the user may prioritize his viewing schedule to view the event that will not be available for streaming first and watch the other event at a later time.

Figure 7:
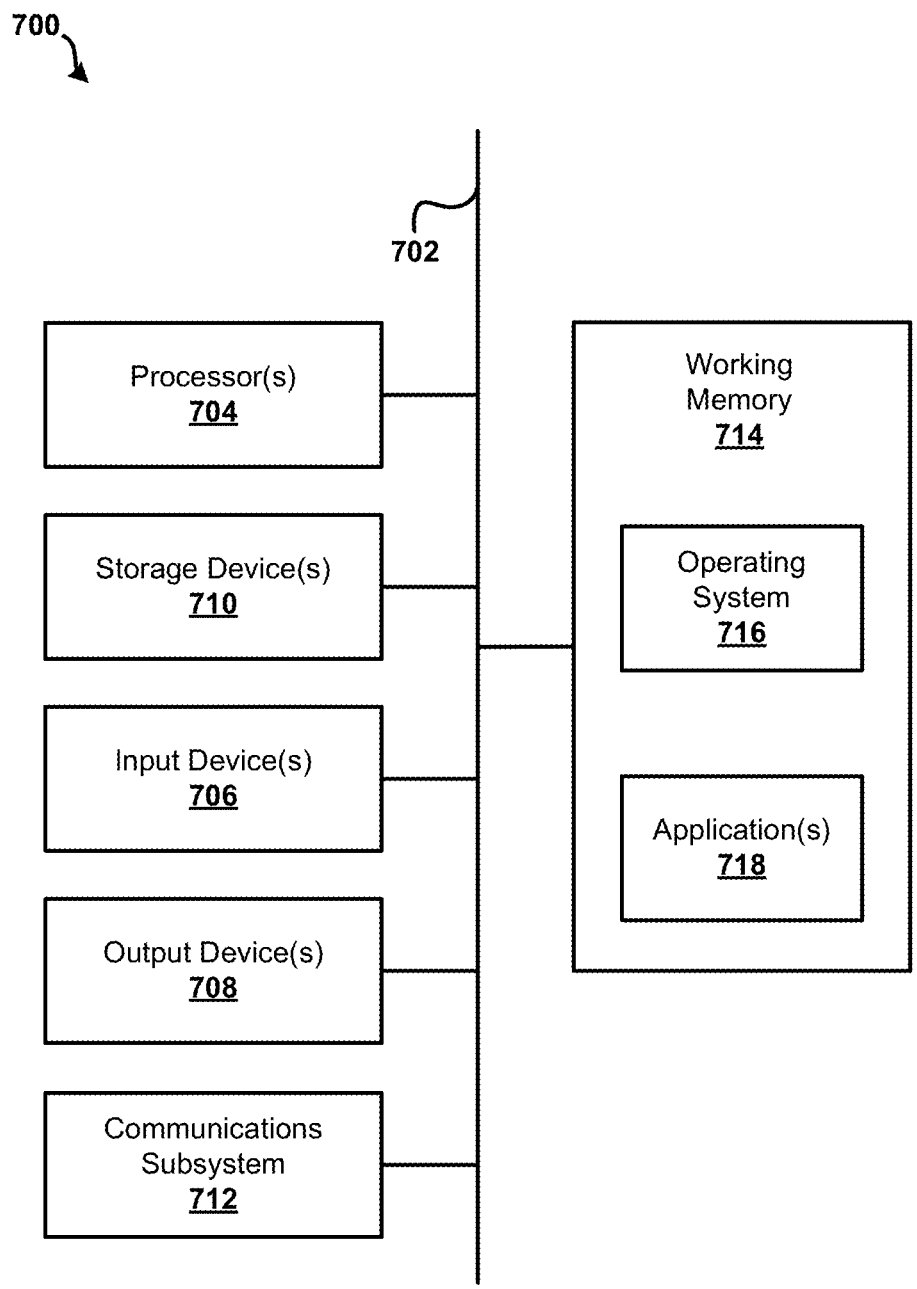
FIG. 7 shows an example computing system or device, in accordance with certain embodiments of the present disclosure.

FIG. 7 shows an embodiment of an example computer system or device 700 in accordance with the present disclosure. An example of a computer system or device includes an enterprise server, blade server, desktop computer, laptop computer, personal data assistant, smartphone, gaming console, set-top-box, and any other type of machine for performing calculations. The computer system 700 may be wholly or at least partially incorporated as part of previously-described computing devices, such as the PTR 110, the secondary television receivers 112a-b, the televisions 114a-c, and the computing devices 116a-b of FIG. 1. The example computer device 700 may be configured to perform and/or include instructions that, when executed, cause the computer system 700 to perform the method of FIG. 4 and FIG. 5. The example computer device 700 may be configured to perform and/or include instructions that, when executed, cause the computer system 700 to instantiate and implement functionality of the forward metadata management engine 118.

The computer device 700 is shown comprising hardware elements that may be electrically coupled via a bus 702 (or may otherwise be in communication, as appropriate). The hardware elements may include a processing unit with one or more processors 704, including without limitation one or more general-purpose processors and/or one or more special-purpose processors (such as digital signal processing chips, graphics acceleration processors, and/or the like); one or more input devices 706, which can include without limitation a remote control, a mouse, a keyboard, and/or the like; and one or more output devices 708, which can include without limitation a presentation device (e.g., television), a printer, and/or the like.

The computer system 700 may further include (and/or be in communication with) one or more non-transitory storage devices 710, which can comprise, without limitation, local and/or network accessible storage, and/or can include, without limitation, a disk drive, a drive array, an optical storage device, a solid-state storage device, such as a random access memory, and/or a read-only memory, which can be programmable, flash-updateable, and/or the like. Such storage devices may be configured to implement any appropriate data stores, including without limitation, various file systems, database structures, and/or the like.

The computer device 700 might also include a communications subsystem 712, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities (e.g., GSM, WCDMA, LTE, etc.), and/or the like. The communications subsystem 712 may permit data to be exchanged with a network (such as the network described below, to name one example), other computer systems, and/or any other devices described herein. In many embodiments, the computer system 700 will further comprise a working memory 714, which may include a random access memory and/or a read-only memory device, as described above.

The computer device 700 also can comprise software elements, shown as being currently located within the working memory 714, including an operating system 716, device drivers, executable libraries, and/or other code, such as one or more application programs 718, which may comprise computer programs provided by various embodiments, and/or may be designed to implement methods, and/or configure systems, provided by other embodiments, as described herein. By way of example, one or more procedures described with respect to the method(s) discussed above, and/or system components might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 710 described above. In some cases, the storage medium might be incorporated within a computer system, such as computer system 700. In other embodiments, the storage medium might be separate from a computer system (e.g., a removable medium, such as flash memory), and/or provided in an installation package, such that the storage medium can be used to program, configure, and/or adapt a general purpose computer with the instructions/code stored thereon. These instructions might take the form of executable code, which is executable by the computer device 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer device 700) to perform methods in accordance with various embodiments of the invention. According to a set of embodiments, some or all of the procedures of such methods are performed by the computer system 700 in response to processor 704 executing one or more sequences of one or more instructions (which might be incorporated into the operating system 716 and/or other code, such as an application program 718) contained in the working memory 714. Such instructions may be read into the working memory 714 from another computer-readable medium, such as one or more of the storage device(s) 710. Merely by way of example, execution of the sequences of instructions contained in the working memory 714 may cause the processor (s) 704 to perform one or more procedures of the methods described herein.

The terms "machine-readable medium" and "computer-readable medium," as used herein, may refer to any medium that participates in providing data that causes a machine to operate in a specific fashion. In an embodiment implemented using the computer device 700, various computer-readable media might be involved in providing instructions/code to processor(s) 704 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 710. Volatile media may include, without limitation, dynamic memory, such as the working memory 714.

Example forms of physical and/or tangible computer-readable media may include a floppy disk, a flexible disk, hard disk, magnetic tape, or any other magnetic medium, a CD-ROM, any other optical medium, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 704 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 712 (and/or components thereof) generally will receive signals, and the bus 702 then might carry the signals (and/or the data, instructions, etc. carried by the signals) to the working memory 714, from which the processor(s) 704 retrieves and executes the instructions. The instructions received by the working memory 714 may optionally be stored on a non-transitory storage device 710 either before or after execution by the processor(s) 704.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for managing recording resources for programming events of interest, the method comprising:

receiving, by a television receiver, first programming metadata from a service provider, the first programming metadata specifying at least a first programming event of a first set of one or more programming events, where the first programming event is scheduled to be transmitted from a first source;

receiving, by the television receiver, second programming metadata from the service provider, the second programming metadata specifying at least a second programming event of a second set of one or more programming events, where the second programming event is scheduled to be transmitted from the first source or a second source;

scheduling, by the television receiver, one or more recordings of the first set of one or more programming events in a recording schedule;

ascertaining, by the television receiver, available resources to record the second set of one or more programming events;

after receiving the first programming metadata and the second programming metadata from the service provider, identifying, by the television receiver, a resource conflict based at least in part on event scheduling information for at least the first programming event of the first set of one or more programming events and at least the second programming event of the second set of one or more programming events;

ascertaining, by the television receiver, availability of at least one streaming option for the first programming event or the second programming event, wherein the ascertaining the availability is based at least in part on one or both of the first programming metadata and the second programming metadata received from the service provider in a metadata structure having one or more fields that specify a uniform resource identifier for the at least one streaming option for one or both of the first programming event and the second programming event, where the at least one streaming option corresponds to an option to stream the first programming event or the second programming event via a streaming service as an alternative source for the first programming event or the second programming event, where the alternative source is different from the first source and the second source;

determining, by the television receiver and based at least in part on the availability of the at least one streaming option and based at least in part on a viewing history, whether to maintain or modify the recording schedule, wherein the viewing history tracks unviewed recordings of episodes in a first series that includes the first programming event and/or in a second series that includes the second programming event, and the determining comprises comparing a number of the unviewed recordings corresponding to the first series or the second series to a threshold to determine whether the threshold is satisfied; and managing, by the television receiver, the recording schedule based at least in part on the determining whether to maintain or modify the recording schedule, the managing comprising canceling a scheduled recording of the first programming event or the second programming event when the at least one streaming option is available to stream at least one of the first programming event or the second programming event and when the number of the unviewed recordings satisfies the threshold for the at least one of the first programming event or the second programming event.

2. The method of claim 1, further comprising:
generating a user notification relating to the resource conflict, the user notification for presentation via a display device, wherein the user notification suggests a conflict resolution.

3. The method of claim 2, wherein the managing the recording schedule is responsive to a user selection of one or more user-selectable options presented with the user notification.

4. The method of claim 1, wherein the determining whether to maintain or modify the recording schedule is further based at least partially on a set of one or more conflict rules.

5. The method of claim 1, wherein the first programming metadata and/or the second programming metadata indicates a time of alternative viewing option for one or both of the first programming event of the first set of one or more programming events and the second programming event of the second set of one or more programming events.

6. The method of claim 1, where the first programming event and the second programming event are scheduled to be transmitted from the first source or the second source via satellite or a cable network.

7. A television receiver to manage recording resources for programming events of interest, the television receiver comprising:
one or more processors; and
a memory communicatively coupled with and readable by the one or more processors and having stored therein processor-readable instructions which, when executed by the one or more processors, cause the one or more processors to:

process first programming metadata received from a service provider, the first programming metadata specifying at least a first programming event of a first set of one or more programming events, where the first programming event is scheduled to be transmitted from a first source;

process second programming metadata received from the service provider, the second programming metadata specifying at least a second programming event of a second set of one or more programming events, where the second programming event is scheduled to be transmitted from the first source or a second source;

schedule one or more recordings of the first set of one or more programming events in a recording schedule;

ascertain available resources to record the second set of one or more programming events;

after receiving the first programming metadata and the second programming metadata from the service provider, identify a resource conflict based at least in part on event scheduling information for at least the first programming event of the first set of one or more programming events and at least the second programming event of the second set of one or more programming events;

ascertain availability of at least one streaming option for the first programming event or the second programming event, wherein the ascertaining the availability is based at least in part on one or both of the first programming metadata and the second programming metadata received from the service provider in a metadata structure having one or more fields that specify a uniform resource identifier for the at least one streaming option for one or both of the first programming event and the second programming event, where the at least one streaming option corresponds to an option to stream the first programming event or the second programming event via a streaming service as an alternative source for the first programming event or the second programming event, where the alternative source is different from the first source and the second source;

determine, based at least in part on the availability of the at least one streaming option and based at least in part on a viewing history, whether to maintain or modify the recording schedule, wherein the viewing history tracks unviewed recordings of episodes in a first series that includes the first programming event and/or in a second series that includes the second programming event, and the determining comprises comparing a number an attribute of the unviewed recordings corresponding to the first series or the second series to a threshold to determine whether the threshold is satisfied; and manage the recording schedule based at least in part on the determining whether to maintain or modify the recording schedule, the managing comprising canceling a scheduled recording of the first programming event or the second programming event when the at least one streaming option is available to stream at least one of the first programming event or the second programming event and when the number of the unviewed recordings satisfies the threshold for the at least one of the first programming event or the second programming event.

8. The television receiver of claim 7, wherein the processor-readable instructions which, when executed by the one or more processors, further cause the one or more processors to:
   generate a user notification relating to the resource conflict, the user notification for presentation via a display device, wherein the user notification suggests a conflict resolution.

9. The television receiver of claim 8, wherein the managing the recording schedule is responsive to a user selection of one or more user-selectable options presented with the user notification.

10. The television receiver of claim 7, wherein the determining whether to maintain or modify the recording schedule is further based at least partially on a set of one or more conflict rules.

11. The television receiver of claim 7, wherein the first programming metadata and/or the second programming metadata indicates a time of alternative viewing option for one or both of the first programming event of the first set of one or more programming events and the second programming event of the second set of one or more programming events.

12. A non-transitory, processor-readable medium comprising processor-readable instructions which, when executed by one or more processors, cause the one or more processors to:
   process first programming metadata received from a service provider, the first programming metadata specifying at least a first programming event of a first set of one or more programming events, where the first programming event is scheduled to be transmitted from a first source;
   process second programming metadata received from the service provider, the second programming metadata specifying at least a second programming event of a second set of one or more programming events, where the second programming event is scheduled to be transmitted from the first source or a second source;
   schedule one or more recordings of the first set of one or more programming events in a recording schedule;
   ascertain available resources to record the second set of one or more programming events;
   after receiving the first programming metadata and the second programming metadata from the service provider, identify a resource conflict based at least in part on event scheduling information for at least the first programming event of the first set of one or more programming events and at least the second programming event of the second set of one or more programming events;
   ascertain availability of at least one streaming option for the first programming event or the second programming event, wherein the ascertaining the availability is based at least in part on one or both of the first programming metadata and the second programming metadata received from the service provider in a metadata structure having one or more fields that specify a uniform resource identifier for the at least one streaming option for one or both of the first programming event and the second programming event, where the at least one streaming option corresponds to an option to stream the first programming event or the second programming event via a streaming service as an alternative source for the first programming event or the second programming event, where the alternative source is different from the first source and the second source;
   determine, based at least in part on the availability of the at least one streaming option and based at least in part on a viewing history, whether to maintain or modify the recording schedule, wherein the viewing history tracks unviewed recordings of episodes in a first series that includes the first programming event and/or in a second series that includes the second programming event, and the determining comprises comparing a number of the unviewed recordings corresponding to the first series or the second series to a threshold to determine whether the threshold is satisfied; and
   manage the recording schedule based at least in part on the determining whether to maintain or modify the recording schedule, the managing comprising canceling a scheduled recording of the first programming event or the second programming event when the at least one streaming option is available to stream at least one of the first programming event or the second programming event and when the number of the unviewed recordings satisfies the threshold for the at least one of the first programming event or the second programming event.

13. The non-transitory, processor-readable medium of claim 12, the processor-readable instructions further causing the one or more processors to:
   generate a user notification relating to the resource conflict, the user notification for presentation via a display device, wherein the user notification suggests a conflict resolution.

14. The non-transitory, processor-readable medium of claim 13, wherein the managing the recording schedule is responsive to a user selection of one or more user-selectable options presented with the user notification.

15. The non-transitory, processor-readable medium of claim 12, wherein the determining whether to maintain or modify the recording schedule is further based at least partially on a set of one or more conflict rules.

16. The non-transitory, processor-readable medium of claim 12, wherein the first programming metadata and/or the second programming metadata indicates a time of alternative viewing option for one or both of the first programming event of the first set of one or more programming events and the second programming event of the second set of one or more programming events.

* * * * *

UNITED STATES PATENT AND TRADEMARK OFFICE
CERTIFICATE OF CORRECTION

PATENT NO. : 10,129,585 B2
APPLICATION NO. : 14/202265
DATED : November 13, 2018
INVENTOR(S) : Stephen Michael Bennett Page 1 of 1

It is certified that error appears in the above-identified patent and that said Letters Patent is hereby corrected as shown below:

In the Claims

Column 24, Claim 7, Line 55, please delete "an attribute"

Signed and Sealed this
Fourteenth Day of April, 2020

Andrei Iancu
*Director of the United States Patent and Trademark Office*